United States Patent [19]
Bechade et al.

[11] Patent Number: 5,841,683
[45] Date of Patent: Nov. 24, 1998

[54] LEAST SIGNIFICANT BIT AND GUARD BIT EXTRACTOR

[75] Inventors: Roland Albert Bechade, South Burlington, Vt.; Robert Hayosh, Austin, Tex.; Stephen Gerard Shuma, South Burlington, Vt.

[73] Assignee: International Business Machines Corporation, Armonk, N.Y.

[21] Appl. No.: 718,272

[22] Filed: Sep. 20, 1996

[51] Int. Cl.[6] .................................................. G06F 5/01
[52] U.S. Cl. .............................. 364/748.03; 364/715.04
[58] Field of Search ........................ 364/748.03, 748.02, 364/748.05, 715.04

[56] References Cited

U.S. PATENT DOCUMENTS

| | | | |
|---|---|---|---|
| Re. 33,629 | 7/1991 | Palmer et al. ............................. | 364/748 |
| 4,078,251 | 3/1978 | Hamilton ................................... | 364/700 |
| 4,139,899 | 2/1979 | Julpule et al. ............................ | 395/375 |
| 4,553,220 | 11/1985 | Swanson ............................. | 364/715.04 |
| 4,858,166 | 8/1989 | Schatzberger ............................ | 364/748 |
| 4,947,358 | 8/1990 | Lamere et al. ...................... | 364/715.04 |
| 5,276,634 | 1/1994 | Suzuki et al. ............................. | 364/748 |
| 5,390,135 | 2/1995 | Lee et al. ................................ | 364/749 |
| 5,392,228 | 2/1995 | Burgess et al. ...................... | 364/715.04 |
| 5,432,727 | 7/1995 | Ahem ....................................... | 364/748 |
| 5,459,681 | 10/1995 | Harrison et al. ......................... | 364/736 |
| 5,511,016 | 4/1996 | Bechade .............................. | 364/748.03 |

*Primary Examiner*—David H. Malzahn
*Attorney, Agent, or Firm*—Whitham, Curtis & Whitham; Eugene I. Shkurko, Esq.

[57] ABSTRACT

In connection with a logic circuit including a mask generator for determining a value for a so-called "sticky bit" in a binary number to be truncated and rounded, an intermediate signal is taken from the mask generator and an Exclusive-OR function applied to adjacent bits to generate a second mask containing or adjacent to a transition between the portion of the number to be dropped and the portion to be retained in the truncated number. The second mask is applied to different overlapping groups of bits in a portion of the number which contains the least significant bit and the guard bit as determined from the number of bits to be dropped, for example, by shifting out from a shifter, as the number is truncated and rounded to extract a specific bit in each group of bits. By extracting such specific bits using a mask, the extraction process is removed from the critical path of the processor which includes the shifter and the extraction process can proceed in parallel with the shifting process.

8 Claims, 2 Drawing Sheets

LEAST SIGNIFICANT BIT AND GUARD BIT EXTRACTOR

BACKGROUND OF THE INVENTION

1. Field of the Invention

The present invention generally relates to floating point mathematical data processors and, more particularly, to arrangements for converting the format of binary numbers.

2. Description of the Prior Art

Programmed digital data processors are particularly suited to the performance of extended repetitive and complex operations on data. In regard to mathematical data, once programmed, a data processor can precisely carry out complex computational algorithms for solving or approximating solutions to problems of a complexity which cannot be effectively approached in any other way. Simulations of three dimensional fluid flow systems is an example of such a complex problem.

In complex computations, a particular numerical quantity may be sequentially subjected to numerous separate computations. However, the digital nature of data processors requires that the quantity be expressed in terms of a radix which, unless the expression is of infinite length, may not allow an exact expression of the value of the quantity. Conversely, since any practical processor cannot accommodate expressions of infinite length, many quantities involved in any computation may include slight variations from true values. When such quantities are subjected to numerous sequential computations, often including other quantities having similar slight inaccuracies, the cumulative error can become significant unless compensating adjustments are made.

For this reason, it is the usual practice to periodically store numerical expressions of values used in computations expressed in a so-called single precision (32 bits: 1 sign bit, 8 exponent bits and 23 mantissa bits) or double precision (64 bits: 1 sign bit, 11 exponent bits and 52 mantissa bits) format having standardized numbers of (generally binary) digits in a mantissa and exponent but to use many more such digits in a so-called extended real (80 bits: 1 sign bit, 15 exponent bits and 64 mantissa bits) or similar format internally of the processor to carry out the computation. The increased resolution of the increased number of digits of the extended real format together with selective use of a plurality of rounding techniques to reduce the expression to single precision or double precision format is quite successful in suppressing cumulative errors to levels smaller than can be reflected in a single-precision or double-precision output or other, lesser, precision as may be specified in the computational algorithm. Of course, it should be understood that the expression of the number value could be stored in extended real or higher resolution format and an even higher resolution format used internally of the processor for computation.

Rounding is essentially a process of truncation of a mantissa to a desired number of bits (which may be fewer than are accommodated by the number format) and adjustment, if necessary, of the least significant bit (LSB) in the truncated expression. The choice of rounding technique and its operation require evaluation of the number on which rounding is to be performed to determine the presence and location of any non-zero value (e.g. any is in a binary number) in the truncated portion of the expression. In this evaluation a so-called "sticky bit" is assigned a value of 1 if any is are present in the truncated portion of the number and a value of 0 if no is are present. Additionally, the least significant bit (LSB) which will remain in the truncated number and the so-called "guard bit", which is the next lower order bit below the LSB (or the most significant bit in the truncated portion), must be extracted.

It has been found convenient, as disclosed in U.S. patent application Ser. No. 08/542,478, filed Oct. 12, 1995, now U.S. Pat. No. 5,745,744, which is hereby fully incorporated by reference, to determine the sticky bit value using a mask having a bit for each bit of the (original/internal) number to be rounded. In the mask generated as disclosed therein, all bits have a value of 0 except bits which correspond to the portion of the number to be truncated (e.g. dropped from the truncated number), which are assigned a value of 1. The mask can then be NANDed with the bits to be dropped to perform detection of the presence of a 1 to develop the sticky bit value. The mask is generated based on the desired precision of the number when truncation or format conversion and rounding is to be performed. Since the mask has a large number of digits, such on-the-fly generation of the mask can be accomplished more quickly using the mask generator disclosed therein than retrieval of such a lengthy mask from memory. Further, the necessary logic can be included on the chip with the processor and optimized to the mask generation function to occupy less space than other alternatives for deriving such a mask.

To summarize that disclosure, it is important that the mask be generated as rapidly as possible and the number of sequential stages for generation of the mask are minimized. Further, the amount of chip space required for the mask generator must also be minimized for efficient inclusion in a mathematical processor. Both of these criteria are difficult to achieve particularly because the mantissa to be truncated may be of substantial length. However, the mask generator disclosed therein exploits the fact that the desired output is a string of bits of one logical value followed by a string of bits of another logical value. Thus an input binary number derived from the number of leading zeros in the mantissa (which determines the number of bits by which the mantissa must be shifted) and indicative of a location within the mask of a transition point between logical values of bits is decoded to establish a plurality of blocks of bits each having a single logical value and a single block of bits containing the transition point and strings of bits of appropriate length of each logical value within that block of bits.

The LSB and guard bits can occur at any position within the number, since the number may or may not be normalized, and have been extracted by shifting to drop the bits to be removed from the number. The determination of the sticky bit value described above and in the above incorporated document can be performed in parallel with the shifting operation to speed the rounding operation. However, for the rounding operation (and also for generating a carry to the exponent adder), the extraction of the guard bit and the LSB are the last bits to be brought to the end of the shifter for evaluation (the guard bit is shifted out but the LSB is not) and the extraction of these bits constitutes the critical path in the process since the proper rounding algorithm or exponent addition cannot be chosen or performed until the value of these bits and the sticky bit is known.

Accordingly, there is a need to devise an alternative technique for extraction of the LSB and guard bits which makes them available prior to completion of the shifting operation and thus remove the extraction process from the critical path in the conversion processing. However, any such potential solution is complicated by the fact that the position of the LSB and guard bit is variable in the extended real format expression of the numeric value which may not be normalized in its notation as well as the fact that the desired resolution of the numeric value may be variable.

SUMMARY OF THE INVENTION

It is therefore an object of the present invention to provide a method and apparatus for more rapid extraction of a least significant bit and a guard bit from a binary number to be truncated.

It is another object of the invention to provide a method and apparatus for removing the process of least significant bit and guard bit extraction from a critical path in a mathematical processor as well as from a shifter used in truncation of the number.

It is a further object of the invention to provide a method and apparatus for extraction of a least significant bit and a guard bit from a binary number to be truncated in connection with a mask provided by a mask generator which is provided in a mathematical processor for generating a value of a sticky bit.

In order to accomplish these and other objects of the invention, a method of extracting a bit of a binary number having a plurality of bits is provided including the steps of generating a first mask having a string of binary ones and a string of binary zeros and a single transition therebetween, performing a logical operation on adjacent bits of the mask to derive a second mask having one bit of distinct logic value from all other bits of the second mask, extracting a bit from a plurality of data bits corresponding to the one bit of distinct logic value.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
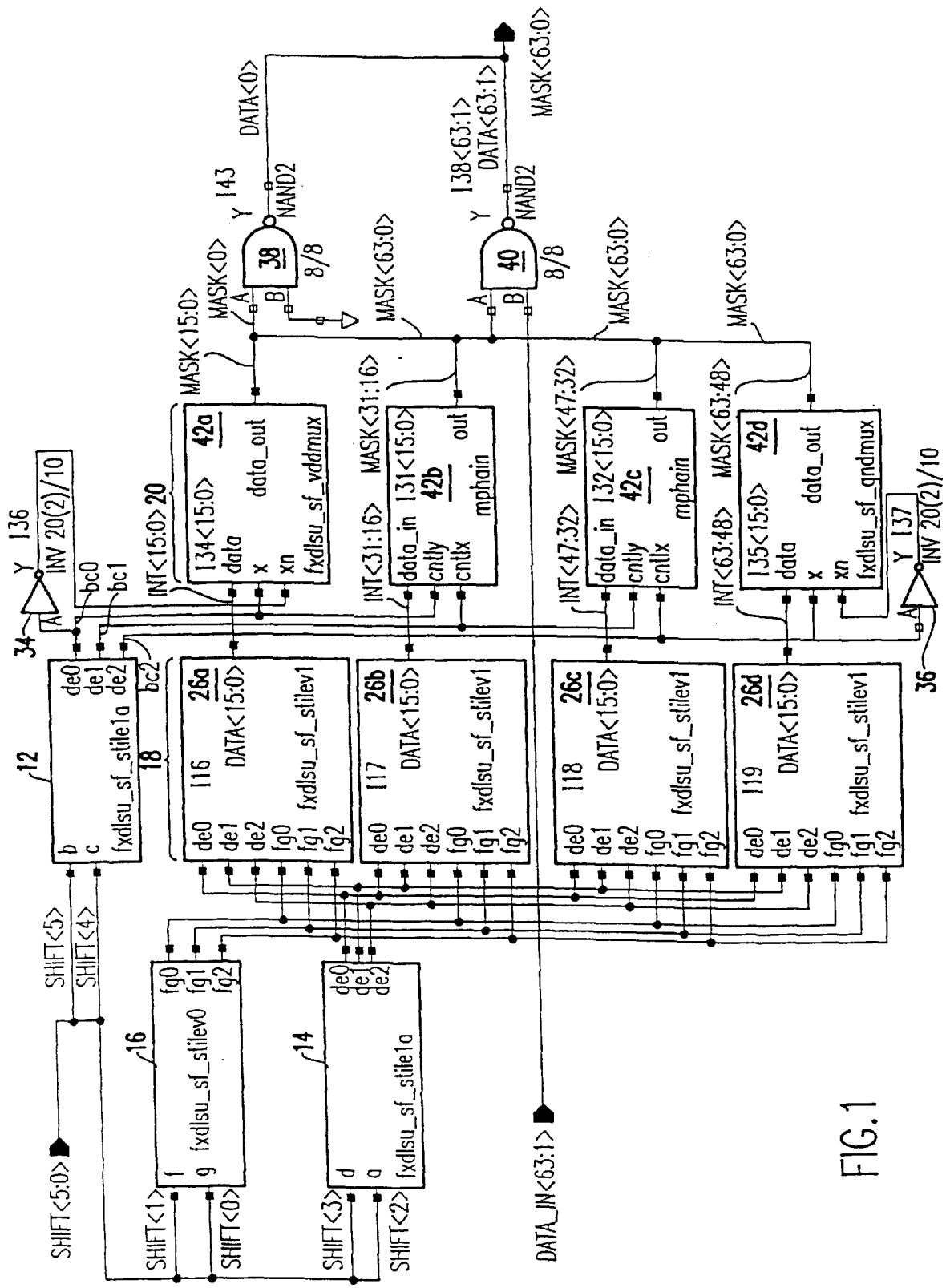
FIG. 1 is a block diagram of the mask generator disclosed in the above-incorporated application Ser. No. 08/542,478, now U.S. Pat. No. 5,745,744.

Referring now to the drawings, and more particularly to FIG. 1, there is shown a block diagram of a mask generator logic circuit 10 as described in the above-incorporated application. Essentially, a number derived by counting the number of leading zeros in the mantissa or truncating by a fixed number of bits as dictated by the respective formats of the internal and target formats (e.g. single or double precision) of the number to be truncated is applied at input 24 and the mask generated in accordance with the transition point between logical states in the bits of the mask as indicated thereby. The number of leading zeros is preferably performed in the manner described in U.S. patent application Ser. No. 08/716,591, assigned to the assignee of the present invention and filed Sep. 18, 1996, which is also fully incorporated by reference.

It should be understood that in the preferred application of the invention, the number to be truncated will be in a 64-bit mantissa in extended real format, as discussed above, and the transition point between logic states of bits of the mask can occur at any point in a mask of the same length (to accommodate resolution reduced below that of single precision, if needed). Thus, in the preferred application, a six-bit input is adequate to indicate 0 to 63 bits of leading zeros, shifting, masking, etc. However, it is important to recognize that the principles of that invention and the present invention can be extended to any desired mantissa length.

As described in the above-incorporated application 08/542,478, the six bit input containing bits b–g, also referred to herein as shift<5> shift <0>, respectively, is divided into three groups of two bits each and each two bit group applied to one of decoders 12, 14 and 16. The higher order groups of bits b, c and d, e are provided to decoders 12 and 14, respectively, which are of similar design. The low order group of bits f, g are decoded by decoder 16 of slightly different design from that of decoders 12 and 14.

Essentially, the outputs of each of these decoders is a string of binary bits which has a transition point at a location defined by the two input bits. For decoders 12 and 14, the location will be specified from the high-order to low-order bits of the output string while the location of the transition in the output string of decoder 16 will be specified from the low-order to high-order bits of the output bit string.

Advantageously, such an arrangement contains some outputs which will contain no transition (e.g. all "ones" or all "zeros") and no decoding for one of such an input bit combination or connection of a corresponding output bit combination thereof to a subsequent stage of the mask generator 10 need be provided, thus limiting the chip space required for the mask generator. For example, since decoder 16 receives two inputs, four combinations of output signals are possible. When such output signals are constrained to output strings of four bits having no more than one transition of logic value, only a limited number of combinations are possible, such as 0000, 0001, 0011 and 0111. In this case, the output string 0000, which could be considered as fg3, has no transition and, more importantly, all four strings will necessarily have one bit which does not change, regardless of input, which can be achieved by connection to a reference source (e.g. ground or the high logic level power supply). Therefore, only the other three bits (fg0, fg1, fg2) need be provided to selector 18 from decoder 16.

In a somewhat similar fashion, a maximum of two of the three outputs of decoders 12 and 14 are required to achieve the desired function of selectors 18 and 20 which also simplifies interconnections and reduces the area required for the same. More specifically, decoders 18 and 20 perform the functions of either passing an input suitably connected thereto from low order bit decoder 16 or blocking that input while outputting a string or strings of logical ones and/or zeros. Therefore, at the extremities of selectors 18 and 20 only the low-order or high order one of three outputs from the corresponding decoder will be relevant to the selector output and a true and inverted low-order and high-order decoder output (e.g. bc0, inverted by inverter 34 applied to the x and xn inputs of selector section 42a of selector 20) is adequate to allow the output of decoder 16 to pass for only a single combination of high order input bits (e.g. b and c). At the other extremity of selector 20, inverter 36 provides a complement of bc2 to selector section 42d. Similar inverters, not shown in selector 18 as depicted in FIG. 1, are nevertheless similarly provided therein to allow passing of appropriately connected outputs of decoder 16 for only a single combination of values of input bits d and e.

Conversely, in the interior sections of selectors 18 and 20, two of the outputs (e.g. either the lower-order pair, bc0, bc1 or de0, de1, or the high-order pair, bc1, bc2 or de1, de2) are required to pass the output of decoder 16 for a particular combination of input bits, b, c or d, e, and a string of zeros and ones contiguous with zeros and ones, respectively, in the output of decoder 16 (including the unchanging input fg3, which may be derived as described above.

It should be further noted for a full understanding of the mask generator as illustrated in FIG. 1, that the respective sections 26a, 26b, 26c and 26d of selector 18 each comprise four subsections (or "stages", as they are referred to in the above-incorporated U.S. patent application Ser. No. 08/542,478) with each sub-section connected to a respective one of the output bits of decoder 16, fg0, fg1 and fg2 and also unchanging bit fg3, derived as described above.

Thus, each section 26a, 26b, 26c and 26d will provide a sixteen-bit wide group of output (preferably in parallel but possibly serial) as intermediate outputs, int<15:0>, int<31:16>, int<47:32> and int<63:48> to respective sections of the second selector stage 20. These outputs of respective sub-sections or stages differ by the combination of values of bits d and e which will allow the output of decoder 16 (e.g. 0000, 0001, 0011 and 0111 for the four possible combinations of f and g) to be passed and the combinations which result in strings of ones and/or zeros but each sixteen bit group will be the same. Even though these sixteen-bit outputs are identical and could, in theory, be provided by a single selector of the same design as any one of selectors 26a–26d, four selector sections (or more if applied to a mantissa of more than 64 bits) are required in second stage selector 20 and provision of a corresponding number of first stage selector sections is preferred as a matter of design in order to reliably drive the same with transistors of preferred size. Also, such an implementation minimizes the number of wiring channels necessary to obtain the function. In fact, the selectors can be multiplied, as shown, in less chip space than the wiring channel for making connections to a single selector. Incidentally, drive considerations become of increased importance when the invention is implemented with the mask generator 10, as will be discussed below, and provision of plural first stage selectors is even more strongly preferred for that reason.

Specifically, for the respective combinations of bits d, e, f and g, the sixteen-bit outputs of each selector section 26a–26d will be a respective line of the following Table 1.

When a similar passing or blocking of these outputs is combined with a similar operation for the four possible combinations of b and c, the following table will be replicated sixteen times along a diagonal of a matrix with zeros above and to the left and ones below and to the right of that diagonal. It may be helpful to an understanding of the invention to also observe that no string of bits containing all ones is necessary. The condition where a transition falls on a boundary between sixteen-bit sections 26a–26d of selector 18 corresponds to a zero value for all of input bits d, e, f and g (e.g. the first row of the above matrix) and that selector 20 will provide a string of sixteen, thirty-two or forty-eight ones to the right of the sixteen zeros provided as described above. Thus, any row of the above matrix can be considered as a partial mask which will contain or be adjacent to a location of a transition between a string of ones and a string of zeros with the LSB on one side of the transition and the guard bit on the other.

Thus it can be seen that for each unique combination of bits b–g, a unique row of a 64×64 matrix be defined which contains a string of bits having a value of zero and a string of bits having a value of one in which the length of the two strings of bits totals sixty-four bits and each pair of strings in a row having a unique position of the transition point between zero-valued bits and onevalued bits. When such a mask is ANDed or NANDed (as depicted at 38 and 40 of FIG. 1) with respective bits of a mantissa to be truncated at a point corresponding to the transition between zeros and ones in the mask, any bit having a value of one in the bits to be dropped will be conserved and thus enable the value of the sticky bit to be determined.

Figure 2:
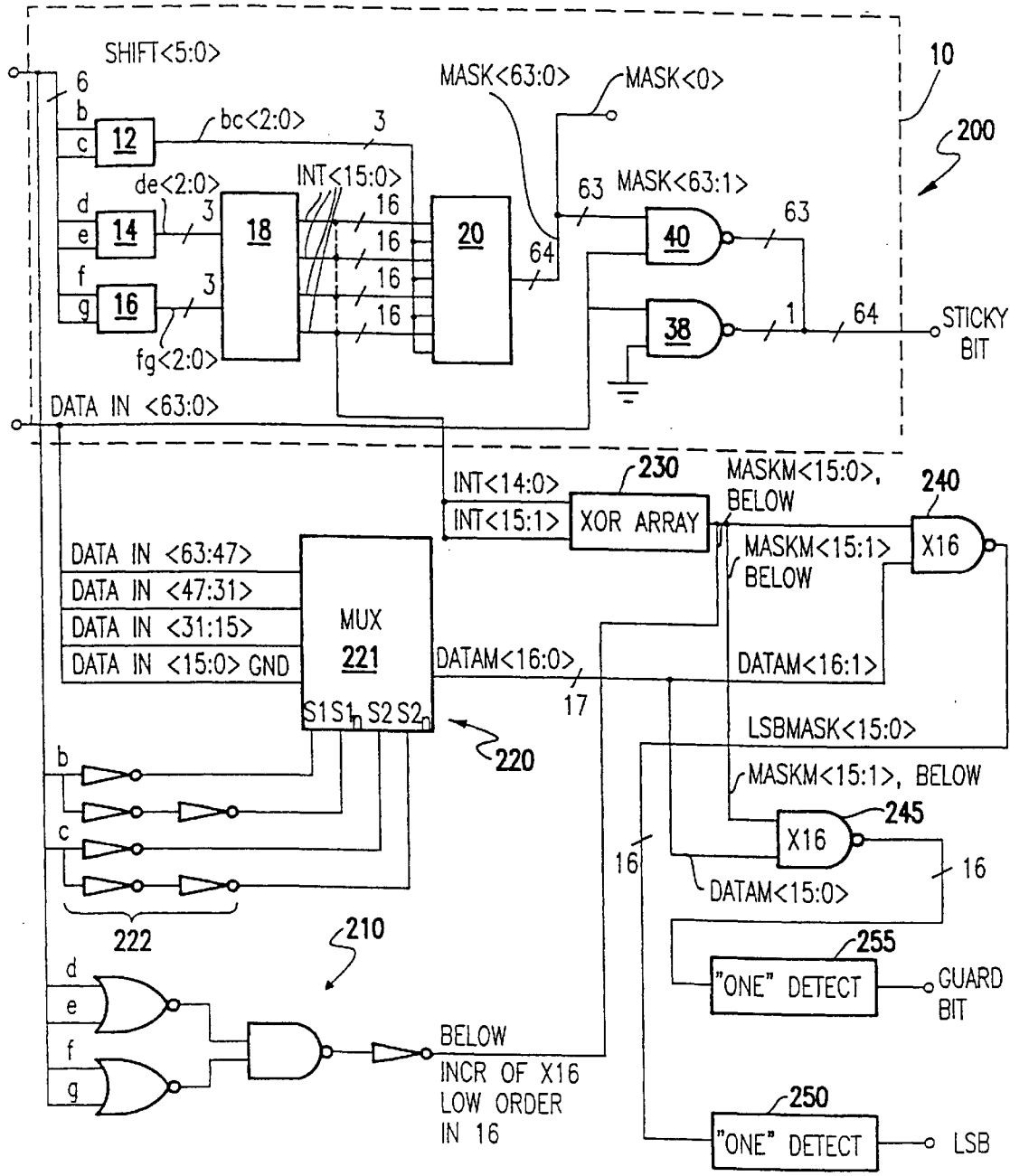
FIG. 2 is a block diagram of the mask generator of FIG. 1 including the LSB and guard bit extractor in accordance with the present invention as implemented with the mask generator of FIG. 1.

Referring now to FIG. 2, additional circuitry for extracting the least significant bit and guard bit will now be described. The basic principle of the invention is to also extract each of these bits with a mask specific to a particular bit position correlated to the number of leading zeros or bits of shifting to be done. However, the generation of a mask specific to a single bit would require far more structure and logic complexity than the mask generator described above and the addition of two further complete mask generators would be prohibitive in terms of chip space. Accordingly, the invention seeks to generate masks for detection of these bits while using as little further structure as possible in addition to the mask generator described above.

In essence, the invention determines a boundary between a string of ones and a string of zeros detected by performing an exclusive-OR function on adjacent bits of the mask generated by the logic circuit 10 of FIG. 1. For example, a two-input exclusive-OR (XOR) function provides an output logic value of one only when unlike inputs are applied and a logic value of zero when the inputs are of the same logic

TABLE 1

| Input | | | | Output | | | | | | | | | | | | | | | |
|---|---|---|---|---|---|---|---|---|---|---|---|---|---|---|---|---|---|---|---|
| | | | | 1 | 1 | 1 | 1 | 1 | 1 | 0 | 0 | 0 | 0 | 0 | 0 | 0 | 0 | 0 | 0 |
| d | e | f | g | 5 | 4 | 3 | 2 | 1 | 0 | 9 | 8 | 7 | 6 | 5 | 4 | 3 | 2 | 1 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 1 | 0 | 0 | 0 | 0 | 0 | 0 | 0 | 0 | 0 | 0 | 0 | 0 | 0 | 0 | 0 | 1 |
| 0 | 0 | 1 | 0 | 0 | 0 | 0 | 0 | 0 | 0 | 0 | 0 | 0 | 0 | 0 | 0 | 0 | 0 | 1 | 1 |
| 0 | 0 | 1 | 1 | 0 | 0 | 0 | 0 | 0 | 0 | 0 | 0 | 0 | 0 | 0 | 0 | 0 | 1 | 1 | 1 |
| 0 | 1 | 0 | 0 | 0 | 0 | 0 | 0 | 0 | 0 | 0 | 0 | 0 | 0 | 0 | 0 | 1 | 1 | 1 | 1 |
| 0 | 1 | 0 | 1 | 0 | 0 | 0 | 0 | 0 | 0 | 0 | 0 | 0 | 0 | 0 | 1 | 1 | 1 | 1 | 1 |
| 0 | 1 | 1 | 0 | 0 | 0 | 0 | 0 | 0 | 0 | 0 | 0 | 0 | 0 | 1 | 1 | 1 | 1 | 1 | 1 |
| 0 | 1 | 1 | 1 | 0 | 0 | 0 | 0 | 0 | 0 | 0 | 0 | 0 | 1 | 1 | 1 | 1 | 1 | 1 | 1 |
| 1 | 0 | 0 | 0 | 0 | 0 | 0 | 0 | 0 | 0 | 0 | 0 | 1 | 1 | 1 | 1 | 1 | 1 | 1 | 1 |
| 1 | 0 | 0 | 1 | 0 | 0 | 0 | 0 | 0 | 0 | 0 | 1 | 1 | 1 | 1 | 1 | 1 | 1 | 1 | 1 |
| 1 | 0 | 1 | 0 | 0 | 0 | 0 | 0 | 0 | 0 | 1 | 1 | 1 | 1 | 1 | 1 | 1 | 1 | 1 | 1 |
| 1 | 0 | 1 | 1 | 0 | 0 | 0 | 0 | 0 | 1 | 1 | 1 | 1 | 1 | 1 | 1 | 1 | 1 | 1 | 1 |
| 1 | 1 | 0 | 0 | 0 | 0 | 0 | 0 | 1 | 1 | 1 | 1 | 1 | 1 | 1 | 1 | 1 | 1 | 1 | 1 | value. Thus, an array of XOR gates will provide a single one output in a string of zeros at a location correlated to a transition between logic values in an input data string.

However, the XOR logic function is more complex to implement (e.g. requires more transistors) than other logic functions. Additionally, it should be recalled that such an XOR gate array would merely detect a transition in the mask generated by the circuit 10 of FIG. 1 and additional logic would be required for each bit to extract the desired bit of the original binary number. Therefore, to provide a number of gates sufficient to detect a transition in a long string of digits would also be prohibitive in terms of chip space. Furthermore, such an array of XOR gates and other logic gates for each bit of the number would be required for each of the LSB and the guard bit since the output must be correlated with a different respective bit for extraction.

To achieve LSB and guard bit extraction using a minimum amount of structure additional to that of FIG. 1, it will be recalled that the circuit of FIG. 1 operates on groups on sixteen bits and that the outputs of the respective sections of the first stage selector 18 are identical and contain the transition which will appear in the mask unless that transition occurs at the boundary of a section and that a transition occurring at a boundary will be determinable from a zero value of all of input bits d, e, f and g. Therefore, while the interstage signal int<15:0> is depicted as being taken from the lower-most section (e.g. 26d in FIG. 1 and corresponding to a row of the above table) of selector 18 in FIG. 2, the same signal can be derived from any other section of selector 18, as may be convenient.

The sixteen-bit interstage signal is divided into two fifteen-bit overlapping groups int<14:0> and int<15:1>. These groups of signals are provided in parallel to exclusive OR gate array 230 such that an XOR fuction is applied to bits 0 and 1, 1 and 2, 2 and 3, . . . 14 and 15 to yield a fifteen-bit mask, maskm<15:1>, consisting of a string of zeros and including a single one unless a transition occurs between strings of zeros and ones in the int<15:0> signal. Logic circuit 210 is provided to detect the condition when all of lower-order input shift signals d, e, f and g (shift<3>-shift<0>) have a logic value of zero and the transition in the mask will occur between (e.g. "below", if at all, since second stage selector 20 will provide logic one values for all bits in groups below the group which is passed) sixteen bit groups provided by respective sections of selector 18 rather than within any group. The output of detector 210 can thus be included with maskm<15:1> as the low-order bit thereof to provide a sixteen-bit bit extraction mask, "maskm<15:1>, below".

It will be recalled from the foregoing that the section of selector 18 which produces outputs which will also be passed by the second stage selector 20 is determined by the high-order bits b and c. Accordingly, bits b and c (shift<5> and shift<4>, respectively) are passed through inverter array 222 to increase drive capability and applied as true and complement selection signals to multiplexer 221. The sixty-four-bit input data and ground (as the low-order bit) are also applied to the multiplexer 221 in seventeen-bit groups, data_in<15:0, gnd>, data_in<31:15>, data_in<47:31> and data_in<63:47>, such that a low order bit of one group is also contained as the high-order bit of an adjacent group, if any in that direction, and vice-versa. Thus, a seventeen-bit group of input data which will contain the LSB and guard bit (adjacent to and below the LSB) will be provided as output datam<16:0>. Because seventeen bits are provided, replicating a bit as the low-order bit corresponding to the "below" bit in the mask (to accommodate the condition when the LSB is the lowest-order bit of a sixteen-bit group) one group of data input to the multiplexer and output in accordance with shift input bits b and c will unconditionally include both the guard bit and the LSB. Other groups of input data need not be considered since the mask generator will generate strings of all zeros or all ones for corresponding groups of mask bits. Therefore, no transition can occur in or immediately below such other groups of mask bits and the LSB and guard bits cannot both be present in the corresponding data input group.

To recapitulate, XOR array 230 and transition detector 210 provide a sixteen-bit mask which unconditionally contains only a single one in a string of zeros. (Of course, complementary signals could be used throughout the mask generator but lower power consumption and lowest number of transistors and other electronic components will generally be achieved if the preferred logic conventions described are followed, as will be appreciated by those skilled in the art.) Concurrently, a seventeen-bit group of input signals unconditionally containing the LSB and guard bit are provided by the multiplexer arrangement 220.

To then use the mask to extract the LSB and guard bits, two sixteen-bit overlapping groups of data signals, datm<16:1> and datm<15:0> are derived by connection to appropriate ones of connections/bits datam<16:0> and NANDed (or ANDed, NANDing being preferred as requiring fewer transistors to implement) with the mask (maskm<15:1>, below) at NAND gate arrays (sixteen parallel NAND gates) 240 and 245, respectively. The offset of the data inputs applied allows a single mask to be used to extract both the LSB and the guard bit with a single mask and respective NAND gate arrays, minimizing the number of electronic elements and connections necessary for mask generation and connection of data thereto.

Of course, the number of gates could be reduced but at the expense of additional groups in mask generator 10 and additional selection availability in the multiplexer. Therefore, the articulation of the invention, as described, is considered preferable and optimum for operation on a sixty-four bit mantissa. For larger (or smaller) mantissas, either larger (or smaller) groups or an increased (or decreased) number of groups could be employed in accordance with the principles of the invention as may be dictated by well-understood methods of logic circuit design and optimization.

The outputs of NAND gate arrays 240, 245 will, at most, contain a single bit having a distinct logic value (e.g. one) since only a single gate will receive a one from the mask bits (maskm<15:1>, below or maskm<16:1>) applied thereto and that value will reflect the value of the guard bit or LSB, respectively. The location of the bit is unimportant since it is specified in the mask and only the value is important to the selection and performance of a rounding algorithm, as alluded to above. Accordingly, a "ones detector" 255, 250 (although the distinct value bit may be a zero in a string of ones, depending on the logic and output convention of NAND gate arrays 240, 245) of simple design and few parts, such as a sixteen input OR gate (with input inversion, if necessary) can be used to complete extraction of the value of the LSB and guard bit from the outputs of NAND gate arrays 245 and 240, respectively.

In view of the foregoing, a logic circuit requiring relatively few circuit elements beyond those required for extraction of a sticky bit is provided which can extract both the LSB and the guard bit values from a mantissa to be truncated. The chip space required is minimal in comparison with a load special function unit or that of a mathematical processor. The extraction of the LSB and the guard bit is thus removed from the critical path of the mathematical processor or load special function unit therein and made completely independent of a shifter used to truncate the mantissa and thus can be completed prior to the completion of the shifting operation. Speed of extraction of these bit values is also enhanced by the low capacitance of the internal network of the extractor since extraction is carried out on a relatively small number of the bits of the mantissa and common connections of overlapping groups of bits serve to minimize the length and area of the relatively few connections which are required.

Simulation has shown more than a one nanosecond improvement in the time required for extraction of these values as compared with a path through the shifter as employed prior to the present invention. Therefore, the extraction and shifting can be completed in parallel and in a single clock cycle, greatly enhancing the performance of the mathematical processor. The improvement can be especially appreciated when it is considered that such truncation for storage is carried out for each or every very small number of mathematical operations performed in order to suitably limit round-off error accumulation.

While the invention has been described in terms of a single preferred embodiment, those skilled in the art will recognize that the invention can be practiced with modification within the spirit and scope of the appended claims.

We claim:

1. A method of extracting a bit of a binary number having a plurality of bits, said method including the steps of generating a first mask having a string of binary ones and a string of binary zeros and a single transition therebetween, performing a logical operation on adjacent bits of said mask to derive a second mask having one bit of distinct logic value from all other bits of said second mask, extracting said bit of said binary number from said plurality of bits corresponding to said one bit of distinct logic value.

2. A method as recited in claim 1, including the further step of extracting a second bit from said binary number in accordance with said second mask applied to said plurality of bits.

3. A method as recited in claim 2, wherein at least one of said first mask and said second mask is a partial mask having a length less than said plurality of bits of said binary number, wherein said extracting step includes the further steps of selecting a portion of said binary number containing said bit and said second bit to be extracted and applying said second mask to a different group of bits of said portion of said binary number for each of said bit and said second bit to be extracted.

4. A method as recited in claim 3, wherein said extracting step includes the further steps of detecting if said transition in said first mask occurs at a boundary of said partial mask, and generating an additional bit in said second mask in accordance with said detecting step.

5. A method as recited in claim 1, wherein at least one of said first mask and said second mask is a partial mask having a length less than said plurality of bits of said binary number, wherein said extracting step includes the further steps of selecting a portion of said binary number containing said bit to be extracted and applying said second mask to a group of bits of said portion of said binary number.

6. A method as recited in claim 5, wherein said extracting step includes the further steps of detecting if said transition in said first mask occurs at a boundary of said partial mask, and generating an additional bit in said second mask in accordance with said detecting step.

7. A method as recited in claim 1, wherein said extracting step includes the step of logically combining bits of said second mask with respective bits of said binary number to produce a string of bits.

8. A method as recited in claim 7, including the further step of determining a logic value of said extracted bit by detecting any bit of a distinct logical value within said string of bits.

* * * * *